(12) United States Patent
Wang et al.

(10) Patent No.: US 8,303,194 B2
(45) Date of Patent: Nov. 6, 2012

(54) TRANSCEIVER AND BI-DIRECTIONAL SIGNAL TRANSMISSION SYSTEM THEREOF

(75) Inventors: You-Fa Wang, Singapore (SG); Yun Xu, Singapore (SG)

(73) Assignee: Lite-On Singapore Pte. Ltd., Northtec (SG)

( * ) Notice: Subject to any disclaimer, the term of this patent is extended or adjusted under 35 U.S.C. 154(b) by 611 days.

(21) Appl. No.: 12/560,597

(22) Filed: Sep. 16, 2009

(65) Prior Publication Data

US 2011/0064418 A1    Mar. 17, 2011

(51) Int. Cl.
*G02B 6/36*    (2006.01)
(52) U.S. Cl. ............... 385/93; 385/88; 385/89; 385/92; 385/94
(58) Field of Classification Search .............. 385/93
See application file for complete search history.

(56) References Cited

U.S. PATENT DOCUMENTS

| 6,243,508 | B1 * | 6/2001 | Jewell et al. ................... 385/14 |
| 6,453,091 | B2 * | 9/2002 | Kawai ............................. 385/33 |
| 6,869,232 | B2 * | 3/2005 | Schunk et al. ................. 385/93 |
| 7,364,368 | B2 * | 4/2008 | Kropp ............................. 385/89 |
| 7,654,753 | B2 * | 2/2010 | Sheau Tung Wong et al. . 385/93 |

* cited by examiner

*Primary Examiner* — Ryan Lepisto
(74) *Attorney, Agent, or Firm* — Rabin & Berdo, P.C.

(57) ABSTRACT

A transceiver includes a lead-frame, a signal emitter, a signal receiver, and a coupling lens. The signal emitter and the signal receiver are attached on a same pad of the lead-frame. The coupling lens covers the signal emitter and the signal receiver. Since the positions of the signal emitter and the signal receiver are adjacent to each other, the coupling lens can be used to couple the signal emitter and the signal receiver for transmitting and receiving signals.

14 Claims, 5 Drawing Sheets

TRANSCEIVER AND BI-DIRECTIONAL SIGNAL TRANSMISSION SYSTEM THEREOF

BACKGROUND OF THE INVENTION

1. Field of the Invention

The present invention relates to a transceiver and a bi-directional signal transmission system thereof, in particular, to a transceiver including only one coupling lens for coupling signals to transmit and receive the signals, and a cable connected to the transceiver to produce a bi-directional signal transmission system.

2. Description of Related Art

In general, optical fiber is used for transmitting signals of electric and electronic devices such as telephones, cable televisions or the Internet, and sometimes a single fiber can be used for transmitting signals of all of the aforementioned devices. Compared with conventional copper wires, the optical fiber improves the attenuation and interference of signals, and has significant advantages over the copper wire in many aspects, particularly in long-distance and mass transmission applications.

To achieve a bi-directional communication function of the signals, a communication device is installed separately at both signal emitting and receiving ends, so that a signal emitting module of a first communication device can emit a signal and transmit the signal to a signal receiving module of a second communication device through the optical fiber. On the other hand, a signal emitted from the signal emitting module of the second communication device is returned to the signal receiving module of the first communication device by another optical fiber to achieve the effect of transmitting signals between the two communication devices. However, the signal emitting module of each communication device includes a signal emitting source and a coupling lens installed corresponding to the signal emitting source for coupling the signal. Similarly, the signal receiving module of each communication device includes a signal receiving terminal and a coupling lens installed corresponding to the signal receiving terminal. In other words, each communication device must have two coupling lenses installed corresponding to the signal emitting source and the signal receiving terminal respectively, and thus the whole communication system requires two sets of optical fibers for transmitting and receiving signals respectively.

Due to the required quantity of coupling lenses, the volume of a conventional communication device cannot be reduced further, and thus the application of the communication module is limited. On the other hand, the price of the optical fiber is high, and each communication system requires two sets of optical fibers, and thus the cost of a communication system cannot be reduced.

In view of the aforementioned shortcomings, the inventor of the present invention designed and developed a transceiver in accordance with the present invention to overcome the shortcomings of the prior art.

SUMMARY OF THE INVENTION

Therefore, it is a primary objective the present invention to provide a transceiver and a bi-directional signal transmission system thereof, and the transceiver comprises a signal emitter and a signal receiver, both installed on a same pad, and thus a single coupling lens can cover a light emitting surface of the signal emitter and an optical detecting surface of the signal receiver, such that the signal emitter and the signal receiver can be used for receiving and transmitting signals through the single coupling lens.

To achieve the foregoing objective, the present invention provides a transceiver, comprising a lead-frame having a pad, a signal module (including a signal emitter and a signal receiver) and a coupling lens, wherein the signal emitter and the signal receiver are installed on the same pad of the lead-frame; and the coupling lens is covered onto the signal emitter and the signal receiver and provided for guiding an external signal beam to be incident into the signal receiver, and guiding a signal beam of the signal emitter to be emitted to the outside. Since the signal emitter and the signal receiver are covered by the coupling lens, therefore the signal emitter and the signal receiver can be used for transmitting and receiving signals through the single coupling lens.

In addition, the transceiver further comprises a package for integrating the coupling lens or installing the coupling lens thereon.

The present invention also provides a bi-directional signal transmission system comprising two of the aforementioned transceivers, and a cable installed between the two transceivers for transmitting and receiving signals between the two transceivers bi-directionally.

The present invention has the following advantages. The transceiver of the present invention can transmit and receive optical signal by coupling and transmitting the signals through the same coupling lens without requiring any additional optical component. The two transceivers simply operate with a single coupling lens to achieve a bi-directional signal transmission system, and thus the transceiver and the bi-directional signal transmission system of the present invention feature a low manufacturing cost.

The characteristics and technical contents of the present invention will become apparent by the detailed description of the following preferred embodiments together with the illustration of related drawings. It is noteworthy to point out that the drawings are provided for the reference and illustration purposes only, but not intended to limit the scope of the invention.

DETAILED DESCRIPTION OF THE PREFERRED EMBODIMENTS

Figure 1:
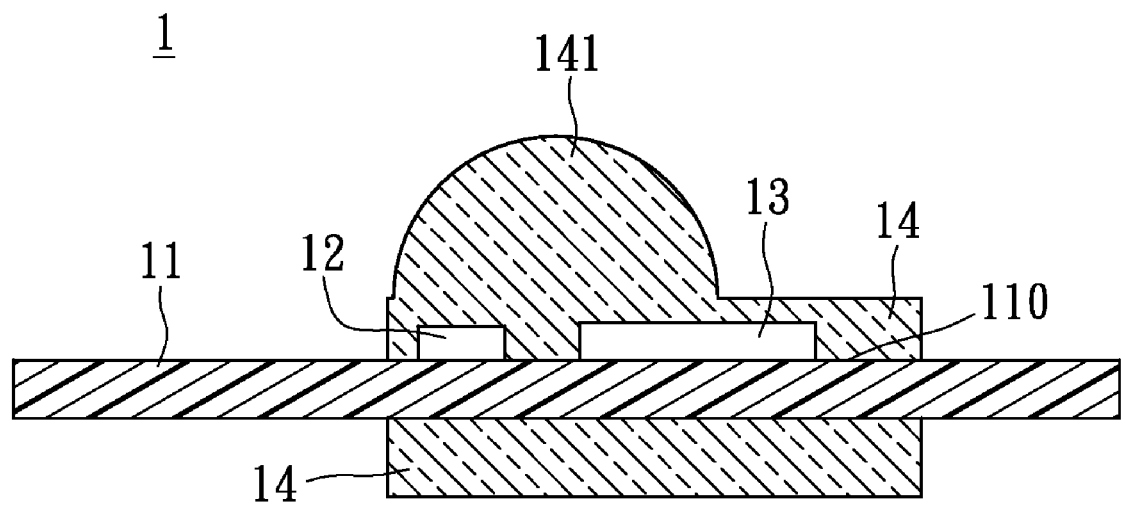
FIG. 1 is a schematic view of a transceiver in accordance with a first preferred embodiment of the present invention.
Figure 1A:
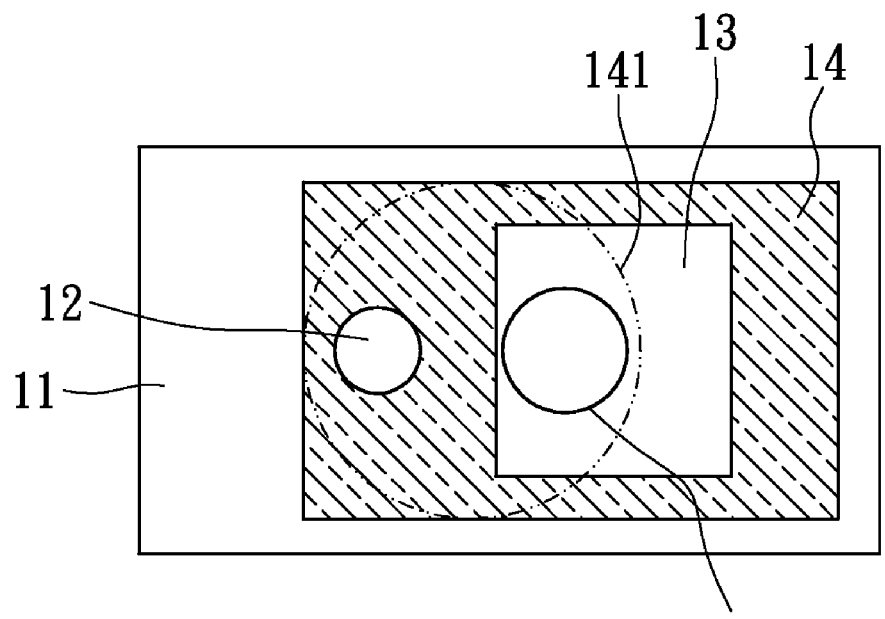
FIG. 1A a top view of a transceiver in accordance with the present invention.

With reference to FIGS. 1 and 1A, the present invention provides a transceiver and a bi-directional signal transmission system thereof, and the transceiver 1 comprises a lead-frame 11, a signal emitter 12, a signal receiver 13 and a package 14. The package 14 further includes a single coupling lens 141 for simultaneously covering a light emitting surface of the signal emitter 12 and an optical detecting surface 131 of the signal receiver 13 (as shown in FIG. 1A), such that the signal emitter 12 and the signal receiver 13 can transmit and receive signals through the coupling lens 141. The transceiver 1 of the present invention simplifies the components of the conventional signal transmission devices and uses the coupling lens 141 to achieve the effects of transmitting and receiving signals by the signal emitter 12 and the signal receiver 13, so as to save the manufacturing cost of the transceiver 1.

Figure 2:
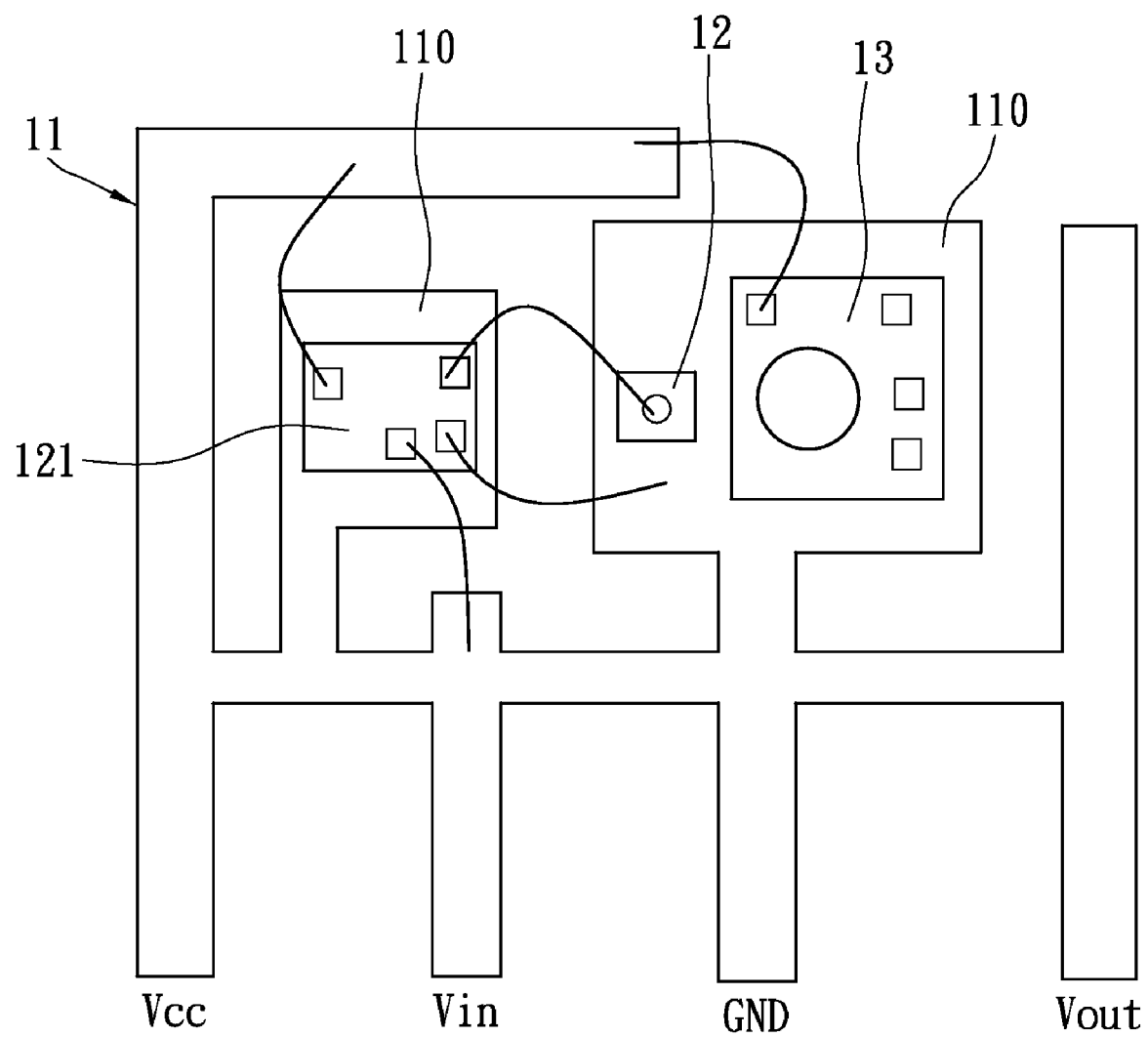
FIG. 2 is a schematic view of a circuit layout a transceiver in accordance with the present invention.

The effects achieved by the structure of the transceiver 1 are described in details as follows. With reference to FIG. 2, the lead-frame 11 is provided for achieving the functions of a circuit. According to different electric functions, the structure of the lead-frame 11 can be divided into different pins such as Vcc and GND pins, and the lead-frame 11 is mainly provided for carrying the signal emitter 12, the signal receiver 13 and the package 14. In other words, the lead-frame 11 includes a plurality of pads 110, and a signal emitter 12 and a signal receiver 13 are installed on the pads 110 of the lead-frame 11 by a mounting or wire-bonding process. The signal emitter 12 and the signal receiver 13 of the present invention are installed on the same pad 110, and both signal emitter 12 and signal receiver 13 are installed as closely as possible with each other to improve the quality of transmitting and receiving signals by the single coupling lens 141.

The package 14 is provided for packaging the signal emitter 12 and the signal receiver 13 to protect related electronic components, and the package 14 further forms a coupling lens 141 corresponding to the signal emitter 12 and the signal receiver 13, such that a signal emitted from the signal emitter 12 can be transmitted to the outside through the coupling lens 141, and a signal emitted from another signal transmitter can be received by the signal receiver 13 through the coupling lens 141. In other words, the signal emitter 12 and the signal receiver 13 of the transceiver 1 can share a same coupling lens 141, and use the optical properties of the same coupling lens 141 to guide an external signal beam to be incident into the signal receiver 13, and guiding a signal beam of the signal emitter 12 to be emitted to the outside, so as to achieve the effects of transmitting and receiving signals.

With reference to FIGS. 1 and 2 again, FIG. 1 shows a transceiver of a first preferred embodiment of the present invention, and FIG. 2 shows a schematic diagram of a circuit layout of the transceiver. The transceiver 1 comprises a lead-frame 11, a signal emitter 12, a signal receiver 13 and a package 14, and the signal emitter 12 and the signal receiver 13 include but not limited to a light emitting diode (LED) and a photo detector IC, wherein the light emitting diode and the photo detector IC of this preferred embodiment are installed on a same pad 110 of the lead-frame 11, and the light emitting diode and the photo detector IC are fixed onto the same pad 110 of the lead-frame 11 by a die-attach technology, and it is preferably to have the smallest possible distance between the light emitting diode and the photo detector IC, which is less than 6 mil in this preferred embodiment, and the package 14 is manufactured by an injection molding process, so that the coupling lens 141 (such as one lens or a lens module) is integrated with the package 14 and disposed at the top of the package 14. In this preferred embodiment, the package 14 is provided for packaging the front sides of the light emitting diode and the photo detector IC as well as the backside of the pad 110, which is disposed opposite to the front side. In other words, the package 14 can package the lead-frame 11, and the signal emitter 12 and the signal receiver 13 installed on the same pad 110 of the lead-frame 11 at the same time. The focusing plan of the coupling lens 141 can be used for bi-directionally transmitting a signal emitted from the light emitting diode or receiving a signal transmitted from the photo detector IC, wherein the coupling lens 141 and the package 14 can be made of a transparent material.

In FIG. 2, the transceiver 1 further comprises a light emitting diode driver chip 121 installed on another pad 110 of the lead-frame 11 and electrically coupled to the light emitting diode and other pins (such as $V_{cc}$ and $V_{in}$ pins) of the lead-frame 11 by a wire-bonding process. Therefore, the light emitting diode driver chip 121 can receive an external control signal through the aforementioned pins and drive the light emitting diode to emit a signal according to the control signal, such that the signal can be transmitted to the outside through the coupling lens 141. In addition, a signal transmitted from another signal transmitter can be received by the photo detector IC through the coupling lens 141. In other words, the coupling lens 141 simultaneously correspond to a light emitting surface of the signal emitter 12 and an optical detecting surface of the signal receiver 13 for coupling an optical signal to achieve the effect of emitting and receiving light.

It is noteworthy to point out that the first preferred embodiment can be modified into another embodiment. For example, the signal emitter 12 can be a vertical cavity surface emitting laser (VCSEL) or any other type of optical signal device. In another preferred embodiment, the light emitting diode driver chip 121 can be integrated into the photo detector IC of the first preferred embodiment, and the circuit layer as shown in FIG. 2 is adjusted according to the integrated components.

Figure 3:
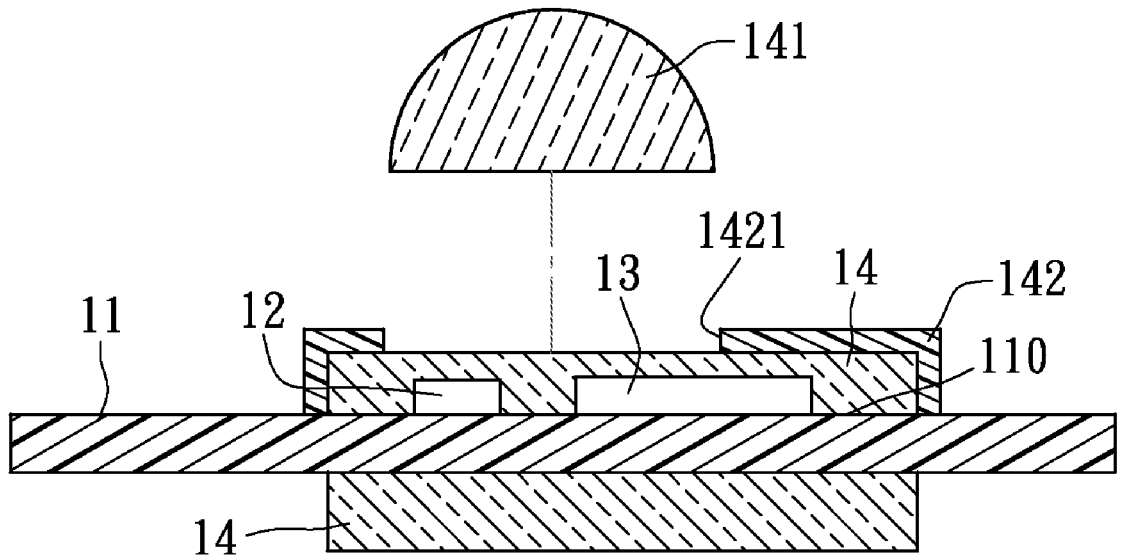
FIG. 3 is a schematic view of a transceiver in accordance with a second preferred embodiment of the present invention.

With reference to FIG. 3 for a second preferred embodiment of the present invention, the difference of this preferred embodiment from the first preferred embodiment resides on that the coupling lens 141 is assembled and connected to the package 14. Similar to the first preferred embodiment, the package 14 is provided for packaging a front side of the pad 110 having the signal emitter 12 and the signal receiver 13, and packaging a backside of the pad 110 which is disposed opposite to the front side, and the package 14 further includes an assembling device 142 for installing the coupling lens 141. In other words, the coupling lens 141 and the package 14 are not integrally formed with one another. Further, the assembling device 142 forms a through hole 1421 disposed thereon and corresponding to the signal emitter 12 and the signal receiver 13, such that an optical signal can be transmitted and received by the coupling lens 141 through the through hole 1421.

Figure 4:
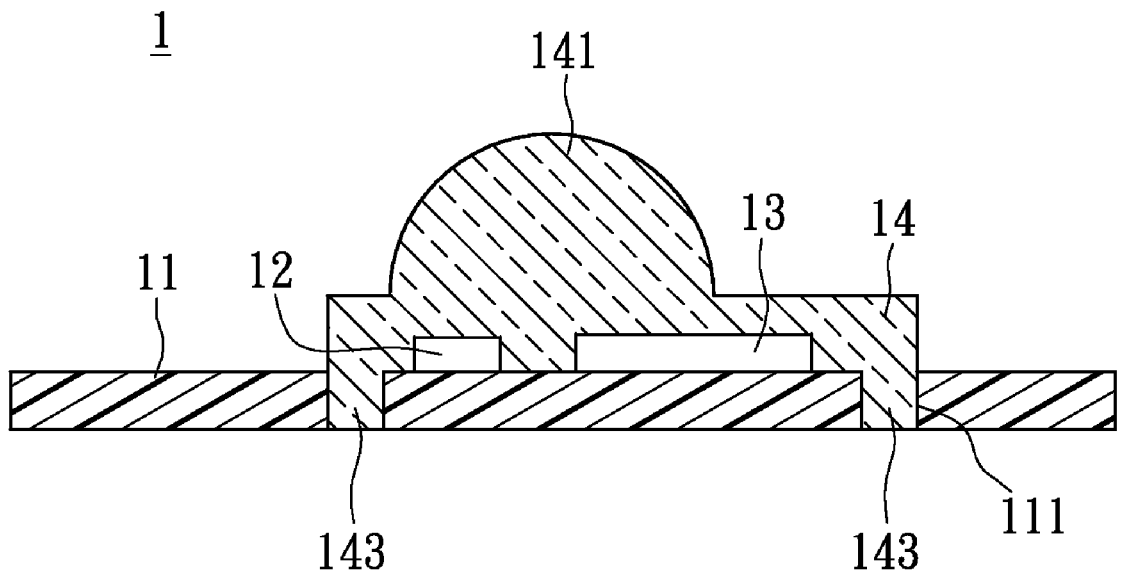
FIG. 4 is a schematic view of a transceiver in accordance with a third preferred embodiment of the present invention.

With reference to FIG. 4 for a third preferred embodiment of the present invention, the difference of this preferred embodiment from the first and second preferred embodiments resides on that the package 14 is formed on the front side of the pad 110 having the signal emitter 12 and the signal receiver 13, but the package 14 is not covered onto the backside of the pad 110. In this preferred embodiment, the lead-frame 11 includes a plurality of die holes 111 disposed thereon, and the package 14 includes a fixing device 143 inserted into the corresponding die hole 111, such that the fixing device 143 and the die hole 111 can be used for installing the integrally formed package 14 and coupling lens 141 onto the lead-frame 11 and corresponding to the signal emitter 12 and the signal receiver 13. This preferred embodiment can be achieved by the following manufacturing procedure. Firstly, the signal emitter 12 and the signal receiver 13 are fixed onto a same pad 110 of the lead-frame 11, and the lead-frame 11 includes the aforementioned die holes 111. Secondly, a mold (not shown in the figure) is placed at the front side (which is a lateral side for fixing the signal emitter 12 and the signal receiver 13) of the pad 110, and then a packaging material is injected from the backside of the pad 110 through the die hole 111. After the packaging material is solidified and shaped, the foregoing integrally formed package 14 and coupling lens 141 are produced, and a portion of the packaging material is filled into the die holes 111 and solidified to form the fixing device 143. In other words, this preferred embodiment injects the packaging material from the backside to integrally form the package 14 and the coupling lens 141, and the packaging material can be solidified directly to form the fixing device 143 which is coupled to the die hole 111, such that the package 14 and the coupling lens 141 can be fixed onto the front side of the pad 110 to facilitate the signal emitter 12 and the signal receiver 13 to achieve the effects of transmitting and receiving signals through the coupling lens 141.

Figure 5:
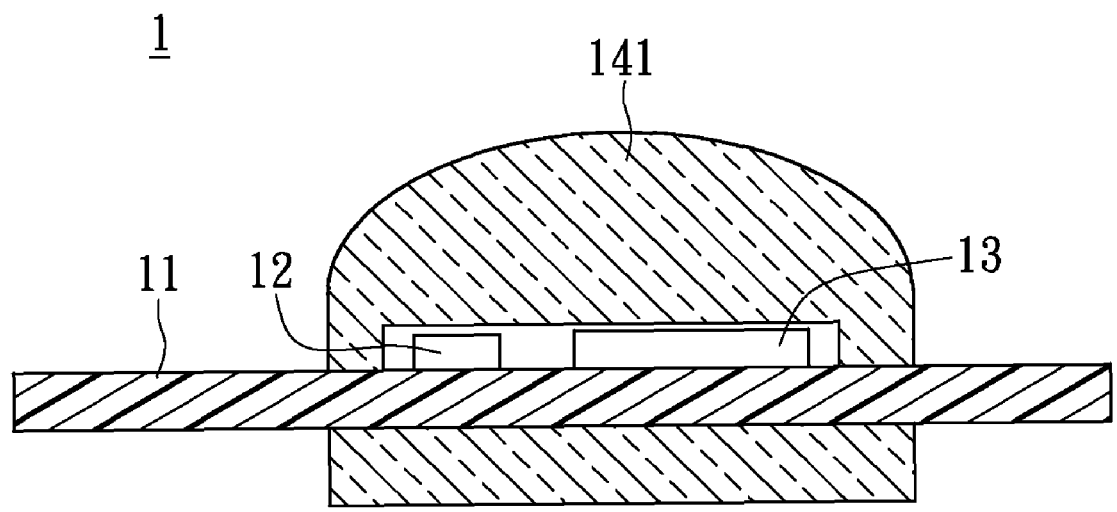
FIG. 5 is a schematic view of a transceiver in accordance with a fourth preferred embodiment of the present invention.

With reference to FIG. 5 for a fourth preferred embodiment of the present invention, the difference of this preferred embodiment from the first preferred embodiment resides on that this preferred embodiment uses the coupling lens 141 to cover both signal emitter 12 and signal receiver 13 without packaging the signal emitter 12 and the signal receiver 13. Similarly, the coupling lens 141 is provided for guiding an external signal beam to be incident into the signal receiver 13, and guiding a signal beam of the signal emitter 12 to be emitted to the outside, so as to achieve the bi-directional signal transmission function.

Figure 5A:
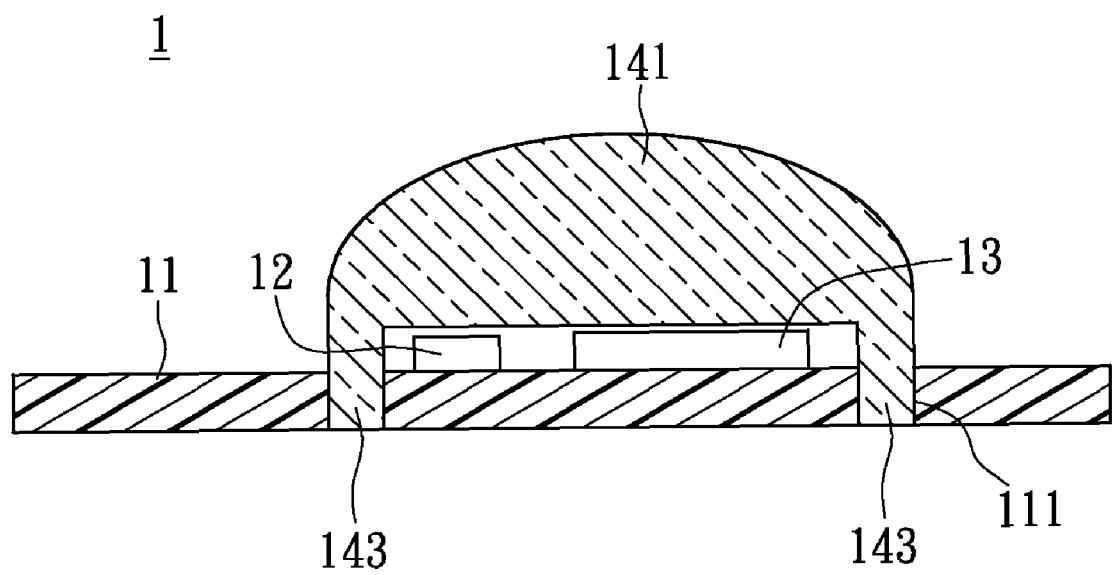
FIG. 5A is a schematic view of a transceiver in accordance with a fifth preferred embodiment of the present invention.

With reference to FIG. 5A for a fifth preferred embodiment of the present invention, the difference of this preferred embodiment from the third preferred embodiment resides on that the coupling lens 141 covers both signal emitter 12 and signal receiver 13 without packaging the signal emitter 12 and the signal receiver 13, and the coupling lens 141 includes a fixing device 143 inserted into the corresponding die hole 111 of the lead-frame 11, such that the die hole 111 and the fixing device 143 can be used for fixing the coupling lens 141 onto the lead-frame 11, and covering the coupling lens 141 onto the signal emitter 12 and the signal receiver 13.

Figure 6:
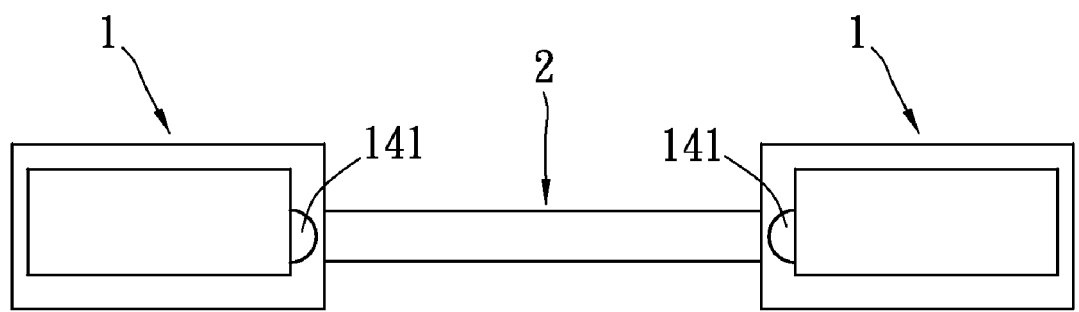
FIG. 6 is a schematic view of a bi-directional signal transmission system in accordance with the present invention.

With reference to FIG. 6 for a bi-directional signal transmission system of the present invention, the bi-directional signal transmission system comprises two transceivers 1 and a cable 2 installed between the two transceivers 1. Since the transceiver 1 of the present invention only has one coupling lens 141, therefore the bi-directional signal transmission system of the present invention can use only one cable 2 for connecting the two transceivers 1 to achieve the bi-directional signal transmission function. For example, the bi-directional signal transmission system of the present invention can be an optical fiber system such as a TOSLINK system used in a digital audio area, and the cable 2 such as a plastic optical fiber (POF) or a TOSLINK cable is used for connecting the two transceivers 1, and both ends of the optical fiber correspond to the coupling lenses 141 of the two transceivers 1 respectively, such that an optical signal emitted from the signal emitter 12 of one of the two transceivers 1 can be transmitted to the optical fiber through the coupling lens 141 and then transmitted to another transceiver 1, and finally received by the signal receiver 13 through the coupling lens 141, and vice versa, so as to achieve the bi-directional signal transmission function.

In addition, the transceiver 1 adopted by the bi-directional signal transmission system of the present invention can be implemented by the foregoing preferred embodiments, and thus will not be described here again.

In summation of the description above, the present invention has the following advantages:

1. Since both signal emitter and signal receiver of the transceiver are installed on the same pad, only one coupling lens is required for covering the light emitting surface of the signal emitter and the optical detecting surface of the signal receiver. Further, the bi-directional signal transmission system only needs one cable to connect the two transceivers, and thus the present invention can save costs.

2. The present invention improves the way of installing the signal emitter and the signal receiver to achieve the effect of coupling optical signals by one coupling lens without requiring any additional optical component such as a beam splitter. In other words, the transceiver of the present invention has a simple structure, whose signal transmission quality will not be reduced due to the installation of the transceiver.

The above-mentioned descriptions represent merely the preferred embodiments of the present invention, without any intention to limit the scope of the present invention thereto. Various equivalent changes, alternations, or modifications based on the claims of the present invention are all consequently viewed as being embraced by the scope of the present invention.

What is claimed is:

1. A transceiver, comprising:
   a lead-frame having a pad and including a plurality of the holes;
   an signal emitter and a signal receiver, both installed on the pad of the lead-frame;
   a package for covering the lead-frame and the signal emitter and signal transceiver disposed thereon, the package being disposed onto a front side and a back side of the pad; and
   a coupling lens disposed at the top of the package, covered onto the signal emitter and the signal receiver, for guiding an external signal beam to be incident into the signal receiver, and for guiding a signal beam of the signal emitter to the outside,
   wherein the coupling lens is integrally formed with or installed onto the package;
   wherein the die holes and the fixing devices are selectively disposed on the package and the coupling lens, and
   wherein a plurality of fixing devices are selectively disposed on the package and the coupling lens, and are configured to be inserted into the corresponding die holes for selectively retaining the package and the coupling lens onto the front side of the pad.

2. The transceiver of claim 1, wherein the package further comprises an assembling device provided for installing the coupling lens onto the package.

3. The transceiver of claim 2, wherein the assembling device has a through hole formed thereon and provided for the signal emitter and the signal receiver to transmit and receive a signal respectively.

4. The transceiver of claim 1, wherein the signal emitter is a light emitting diode and the signal receiver is a photo detector IC.

5. The transceiver of claim 4, further comprising a light emitting diode driver chip integrated in the photo detector IC.

6. The transceiver of claim 4, further comprising a light emitting diode driver chip installed on another pad and electrically coupled to the light emitting diode by a wire-bonding process.

7. A bi-directional signal transmission system, comprising:
   two transceivers, each including:
      a lead-frame having a pad, and having a plurality of the holes;

an signal emitter and a signal receiver, both installed on the pad of the lead-frame;

a package for packaging the lead-frame and the signal emitter and receiver installed thereon;

a coupling lens disposed at the top of the package, covered onto the signal emitter and the signal receiver provided for guiding an external signal beam incident into the signal receiver, and guiding a signal beam emitted by the signal emitter to the outside, the coupling lens being integrally formed with or installed onto the package; and a fixing devices selectively disposed on the package and the coupling lens, configured to be inserted into a corresponding the hole for selectively retaining the package and the coupling lens onto the front side of the pad; and a cable, installed between the two transceivers, and having both ends coupled to the coupling lenses of the two transceivers respectively.

8. The bi-directional signal transmission system of claim 7, wherein the package of each transceiver further comprises an assembling device provided for installing the coupling lens onto the package.

9. The bi-directional signal transmission system of claim 8, wherein the assembling device includes a through hole formed thereon and provided for the signal emitter and the signal receiver to transmit and receive a signal respectively.

10. The bi-directional signal transmission system of claim 8, wherein the package is provided for packaging a front side of the pad having the signal emitter and the signal receiver installed on the pad, and packaging a backside of the pad which is opposite to the front side of the pad.

11. The bi-directional signal transmission system of claim 7, wherein the signal emitter of each transceiver is a light emitting diode, and the signal receiver of each transceiver is a photo detector IC.

12. The bi-directional signal transmission system of claim 11, wherein each transceiver further comprises a light emitting diode driver chip integrated in the photo detector IC.

13. The bi-directional signal transmission system of claim 11, wherein each transceiver further comprises a light emitting diode driver chip installed on another pad and electrically, coupled to the light emitting diode by a wire-bonding process.

14. The bi-directional signal transmission system of claim 7, wherein the cable is a plastic optical fiber.

* * * * *